A. C. ANDREWS.
INDIA RUBBER PACKING.
No. 96,654. Patented Nov. 9, 1869.
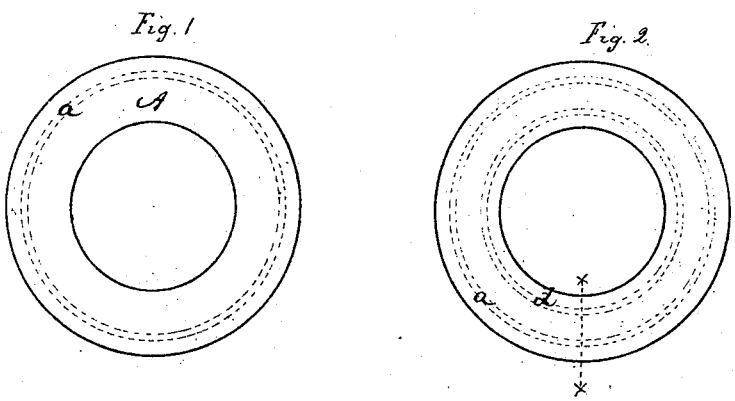

United States Patent Office.

A. C. ANDREWS, OF NEW HAVEN, CONNECTICUT, ASSIGNOR TO THE WATER-PROOF SOLE COMPANY, OF SAME PLACE.

Letters Patent No. 96,654, dated November 9, 1869.

IMPROVEMENT IN INDIA-RUBBER PACKING.

The Schedule referred to in these Letters Patent and making part of the same.

*To all whom it may concern:*

Be it known that I, A. C. ANDREWS, of New Haven, in the county of New Haven, and State of Connecticut, have invented a new Improvement in India-Rubber Packing or Gaskets; and I do hereby declare the following, when taken in connection with the accompanying drawings, and the letters of reference marked thereon, to be a full, clear, and exact description of the same, and which said drawings constitute part of this specification, and represent, in—

Figure 1, a top view of the gasket, with a single run of strengthening-material;

Figure 2, a top view with two runs; and in

Figure 3, a transverse section on line x x, enlarged.

Gaskets have heretofore been made by cutting the form required from fabricated sheet-rubber, the clear rubber not answering the purpose for steam-packing. This not only necessitates a great waste, but the steam will work through the fabric in the packing.

The object of my invention is to overcome these difficulties; and

It consists in moulding the gasket or packing from clear rubber, and introducing therein, at one or more points, while the rubber is in a plastic state, one or more rings or continuous lines of wire, cord, or other suitable material to support the rubber, then vulcanizing the rubber, thus producing the article complete, without cutting or waste of material.

To enable others skilled in the art to make and use my invention, I will proceed to describe the same, as illustrated in the accompanying drawings.

A, fig. 1, is a flat ring, formed from clear rubber, or any of its allied gums, in a mould prepared for the purpose, and during the process of moulding, I introduce, by preference, a metallic or wire ring, *a*, as denoted in broken lines, then submit the moulded packing to the common vulcanizing-process for its completion. This may be at any desired point within or upon the rubber, it being only essential that it be applied or embedded, so as to sustain the rubber against the steam-pressure.

If preferred, another ring, *d*, as denoted in figs. 2 and 3, may be introduced, and for large packings this is desirable, and may be done as in fig. 2, so that the bolts, which connect the two parts upon the packing, will pass between the rings.

While the best results are attained by the employment of metallic rings, rings of cord, or other material, may, instead, be introduced.

By this construction, while the rubber is sustained even to a greater extent than by the common fabricated rubber, there is no possibility for the steam to work through the packing, as it does in the fabric in the common packing; and by moulding the packing, and vulcanizing it in the proper form, there is no waste of material.

Thus I have produced a packing which possesses all the qualities of a clear-rubber packing, without any of the objections to the fabricated packing in common use.

Having fully described my invention,

What I claim as new and useful, and desire to secure by Letters Patent, is—

Gaskets of India rubber, or any of its allied gums, moulded and supported by embedding therein one or more rings or lines of metal, or other suitable material, substantially as herein set forth.

A. C. ANDREWS.

Witnesses:
A. J. TIBBITS,
J. H. SHUMWAY.